United States Patent [19]

Hiramoto

[11] Patent Number: 4,691,204

[45] Date of Patent: Sep. 1, 1987

[54] RADAR APPARATUS

[75] Inventor: Kazuo Hiramoto, Hitachi, Japan

[73] Assignee: Hitachi, Ltd., Tokyo, Japan

[21] Appl. No.: 687,862

[22] Filed: Dec. 31, 1984

[30] Foreign Application Priority Data

Dec. 29, 1983 [JP] Japan ................................. 58-247689

[51] Int. Cl.$^4$ .............................................. G01S 7/28
[52] U.S. Cl. ........................................ 342/22; 342/21;
342/111; 342/134; 342/196; 324/337
[58] Field of Search .............. 343/5 BB, 5 FT, 5 NA;
324/329, 337, 326, 332, 344; 342/22, 129,
134–136, 176, 195, 196, 197, 21

[56] References Cited

U.S. PATENT DOCUMENTS

| | | | |
|---|---|---|---|
| 2,077,707 | 4/1937 | Melton | 343/13 R |
| 3,351,936 | 11/1967 | Feder | 343/5 NA |
| 3,831,173 | 8/1974 | Lerner | 343/5 NA |
| 3,896,434 | 7/1975 | Sirven | 343/5 FT |
| 4,218,678 | 8/1980 | Fowler et al. | 343/5 FT |
| 4,504,833 | 3/1985 | Fowler et al. | 343/5 NA |

OTHER PUBLICATIONS

*Electronic Communications Society Technical Research Report*, pp. 21–28, "Underground Radar System" (T. Suzuki et al); vol. 79, No. 220, 1980.

M. Skolnik, *Intro. to Radar Systems;* pp. 76–77, (McGraw-Hill, 1980).

*Primary Examiner*—T. H. Tubbesing
*Assistant Examiner*—Bernarr Earl Gregory
*Attorney, Agent, or Firm*—Antonelli, Terry & Wands

[57] ABSTRACT

A radar apparatus for detecting a distance from a radar antenna (13) to a buried object (1) underground.

The radar apparatus calculates the distance based on Maxwell's equation relating to speed of propagation of electromagnetic waves using received signals of two or more different frequencies in the receiver (5) which were transmitted from the antenna (13), and thereafter reflected from the buried object (1).

5 Claims, 4 Drawing Figures

4,691,204

RADAR APPARATUS

FIELD OF THE INVENTION

The present invention relates to an object-detecting radar which detects the presence and speed of an object and the distance thereto, and in particular it relates to a radar apparatus suitable for detecting precisely the distance to the object being detected.

BACKGROUND OF THE INVENTION

In a radar apparatus used to obtain information on the presence, distance and speed of an object, this information is usually obtained from the presence of a signal reflected from the object which is obtained by emitting electromagnetic waves thereto, detecting the time elapsed from the transmission of the signal to the reception of reflected waves, and detecting the Doppler shift in the received signal due to the movement of the object being detected.

In an aircraft-detecting radar which determines the position of a flying aircraft, for instance, electromagnetic waves of a frequency of about 1 GHz are emitted from a parabolic antenna, and the presence of the aircraft and the distance thereto are determined from the presence of electromagnetic waves reflected from the aircraft and the time delay from the transmission to the reception of the reflected waves. If the speed of propagation of the electromagnetic waves is v and the time from the transmission of the electromagnetic waves to the reception of the reflected electromagnetic waves is t, the distance d from the radar apparatus to the aircraft can be expressed as follows:

$$2d = vt \qquad (1)$$

The speed of propagation of the electromagnetic waves is given by the following equation which is obtained by solving the Maxwell's equation:

$$v = \frac{1}{\sqrt{\epsilon\mu}\sqrt{\frac{1}{2}\left(\sqrt{1+\left(\frac{\sigma}{\omega\epsilon}\right)^2}+1\right)}} \qquad (2)$$

where $\omega$: angular frequency of electromagnetic waves,
$\epsilon$: permittivity of the medium,
$\mu$: permeability of the medium, and
$\sigma$: conductivity of the medium.

When the medium through which the electromagnetic waves are propagating is the atmosphere, as in the case of aircraft-detecting radar, the permittivity $\epsilon$ and the permeability $\mu$ have the same values as those in a vacuum: $\epsilon = 8.85 \times 10^{-12}$ F/m and $\mu = 1.26 \times 10^{-6}$ H/m. The conductivity $\sigma$ is virtually zero since the atmosphere can be regarded as an insulating substance. Consequently, the speed of propagation v of electromagnetic waves in the atmosphere is equal to the speed of light, i.e., $3 \times 10^8$ m/sec. When the medium is the atmosphere, therefore, the distance to the object being detected can be obtained from just the time required for receiving the reflected waves.

It has recently become necessary to probe for petroleum and minerals under the ground to search for energy resources, or to probe the ground to investigate things buried underground. Electromagnetic waves can be propagated not only through the atmosphere but also through earth, and therefore an object can be detected from the level of a reflected signal even when a conventional radar apparatus using a single reception frequency is employed. Soil mainly consists of silica $SiO_2$, alumina $Al_2O_3$ and water $H_2O$, and it is known that the weight ratios of $SiO_2$, $Al_2O_3$ and $H_2O$ in soil can be 60 to 85%, 10 to 30%, and 1 to 10%, respectively, depending on the nature of the soil.

The speed of propagation v of electromagnetic waves is determined by the permittivity $\epsilon$, permeability $\mu$ and conductivity $\sigma$ of the propagation medium, as shown by Equation (2), so that the values of $\epsilon$, $\mu$ and $\sigma$ in soil are determined by the substances making up that medium and the composition ratios thereof. In dry ground ($SiO_2$:85%, $Al_2O_3$:10%, $H_2O$: 1%), for instance, the permittivity $\epsilon$ is about four times that in a vacuum and the conductivity $\sigma$ is $10^{-4}$ to $10^{-5}$ S/m; while in damp ground ($SiO_2$:60%, $Al_2O_3$:30%, $H_2O$:10%, the value of $\epsilon$ is about eight to thirty times that in a vacuum and the conductivity is approximately $10^{-1}$ to $10^{-3}$ S/m. Although the permeability $\mu$ is almost the same as that in a vacuum, the values of $\epsilon$ and $\sigma$ vary widely from those in a vacuum according to the composition ratios and other factors, as described above. If, in damp ground, the value of $\epsilon$ is about thirty times that in a vacuum and the conductivity is $10^{-3}$ S/m, the speed v of electromagnetic waves of frequency 1 GHz is determined from Equation (2) as $5.5 \times 10^7$ m/sec, i.e., about one-fifth of that in the atmosphere.

When radar is employed for underground investigation, the substances and the composition ratios of the soil are usually unknown. Therefore, the speed of propagation of electromagnetic waves in the medium is unknown, and thus accurate information on the distance to a detected object can not be obtained using radar of a conventional type, although the presence of the object can be detected thereby. In the case of damp ground in which the speed of propagation of electromagnetic wave is $5.5 \times 10^7$ m/sec, for instance, a computation of the distance to the detected object on the assumption that the speed of propagation of electromagnetic waves is the same as that in the atmosphere gives a false result which is about five times the true distance.

One conventional method of this kind is shown in "2.5 SPEED OF PROPAGATION IN UNDERGROUND AND MEASURING DISTANCE" of "UNDERGROUND RADAR SYSTEM", SANE 79-40, reported on Jan. 25, 1980, by Technical Report of IECE in Japan. In this report, a radar antenna must be located on the first place right over the buried object and the second place aparted from D meter from the first place using electromagnetic wave of the same one frequency signal, respectively.

In addition, it is also necessary to determine the speed of propagation v of electromagnetic waves when measuring the speed V of the detected object, since this speed V is expressed by:

$$\Delta\epsilon = -4\pi V \cdot \omega / v \qquad (3)$$

where the angular frequency of the reception signal is $\omega$, the Doppler shift is $\Delta\omega$, and the speed of propagation of electromagnetic waves is v (the negative sign in Equation (3) covers the case in which the object is moving away from the measuring system).

Accordingly, it is difficult to employ a conventional radar apparatus unmodified for determining the distance to an object and its speed of movement in a medium whose permittivity $\epsilon$, permeability $\mu$ and conductivity $\sigma$ are unknown.

SUMMARY OF THE INVENTION

An object of the present invention is to provide an object-detecting radar apparatus which is suitable for detecting and computing very accurately the distance to an object being detected, even when the substances and the composition ratio of a medium are unknown.

The present invention is characterized in that two or more different frequencies are used for measuring and computing the presence and speed of the object being detected and the distance thereto, based on reflected electromagnetic waves which are emitted from an emitter and are reflected back by the object.

According to the present invention, electromagnetic waves of two or more different frequencies, the number thereof depending on the number of unknown values, are received, and the permittivity $\epsilon$, permeability $\mu$ and conductivity $\sigma$ of the propagation medium are determined therefrom. More specifically, electromagnetic waves of at least four different frequencies are used when all of these constants are unknown, electromagnetic waves of at least three different frequencies are used when two of the constants $\epsilon$, $\mu$, and $\sigma$ are unknown, and electromagnetic waves of at least two different frequencies are used when one of $\epsilon$, $\mu$, and $\sigma$ is unknown.

The distance to the object being detected and the speed of propagation of a signal in the medium through which the object is being detected can be obtained from the results thus determined, and the speed of the object can also be determined, if it is moving.

The present invention will be described hereunder on the assumption that all of the constants $\epsilon$, $\mu$, and $\sigma$ are unknown, and that received electromagnetic waves of at least four different frequencies are used. The angular frequencies of four different electromagnetic waves are denoted by $\omega_1$, $\omega_2 \omega_3$, $\omega_4$ ($\omega_1 > \omega_2 > \omega_3 > \omega_4$), and the times from the transmission of these waves to the reception thereof, after propagating to the object being detected and being reflected therefrom, are denoted by $t_1$, $t_2$, $t_3$, and $t_4$, respectively. The speeds of propagation of electromagnetic waves of these frequencies through soil are $v_1$, $v_2$, $v_3$, and $v_4$, respectively, and the distance from the detection radar to the object is d. The following equations hold:

$$2d = v_1 t_1 \quad (4)$$

$$2d = v_2 t_2 \quad (5)$$

$$2d = v_3 t_3 \quad (6)$$

$$2d = v_4 t_4 \quad (7)$$

The value of $v_i$ ($i = 1, 2, 3,$ and 4) is determined from:

$$v_i = \frac{1}{\sqrt{\epsilon \mu} \sqrt{\frac{1}{2}\left(\sqrt{1 + \left(\frac{\sigma}{\omega_i \epsilon}\right)^2} + 1\right)}} \quad (2)$$

Thus, Equations (4) to (7) can be rewritten using Equation (2) in which i is substituted by 1, 2, 3 and 4, respectively. In these equations, the unknown values are d, $\epsilon$, $\mu$ and $\sigma$, while the values of $t_i$ and $\omega_i$ (i = 1, 2, 3, and 4) are known, so that the values of $\epsilon$, $\mu$ and $\sigma$ in addition to the value of d can be obtained by solving Equations (4), (5), (6) and (7). Therefore, not only the distance d to the object being detected, but also the speed of propagation of electromagnetic waves required for computing the speed of the object from the Doppler shift $\Delta \omega$, can be determined. In this case, received electromagnetic waves of four different frequencies are used, but if the values of d, $\epsilon$, $\mu$ and $\sigma$ are computed using electromagnetic waves of at least five different frequencies, the accuracy of these values can be further improved.

In the same way, the value of d and the values of unknown. constants $\epsilon$, $\mu$, and $\sigma$ can be obtained by using electromagnetic waves of at least three different frequencies when two of the constants $\epsilon$, $\mu$, and $\sigma$ are unknown, and by using electromagnetic waves of at least two different frequencies when one of these constants is unknown.

In the detection radar of the present invention, the emission of electromagnetic waves can be realized by a method in which an alternating current, or a sinusoidal pulse, whose intensity varies in a sine wave according to the required reception frequency is passed to an emitter for emission, and also by another method in which a specific pulse current, or a baseband pulse, is applied to the emitter. The latter method, in which Fourier components of pulse electromagnetic waves emitted over a wide frequency range is used, is very effective, since various frequency components can be emitted from a single kind of pulse, and thus the reflected electromagnetic waves of two or more different frequencies used in the present invention can be received, and the apparatus can be constructed easily and at a low cost.

The present invention can be applied to an apparatus in which a single antenna is used in common for transmission and reception, and also to an apparatus in which separate antennas are used for transmission and reception. The distance from the detection radar to the object being detected can be determined according to the present invention as described above, but information on the extent of the object in directions perpendicular to the direction of propagation and the size thereof, etc., can be obtained, if required, by using an antenna with a narrow transmission-reception beam and moving it to a different place to determine the received wave levels and the delay in reception time, etc., from which such information can be obtained.

DETAILED DESCRIPTION OF THE PREFERRED EMBODIMENTS

In the present embodiment, the description concerns a radar apparatus used for investigating a long article buried in the ground such as a gas or water pipe, for instance. A buried object 1 such as a gas or water pipe is usually laid underground at a maximum depth of three meters. Within this range, soil is composed of $SiO_2$, $Al_2O_3$, and $H_2O$, and the permeability thereof can be regarded as the same as that in a vacuum. In the present embodiment, therefore, received electromagnetic waves of three different frequencies $f_1$, $f_2$, and $F_3$ ($f_1 > f_2 > f_3$) are used, since the distance d to the object being detected, the permittivity $\epsilon$, and the conductivity $\sigma$ are unknown. The transmission waves are pulse waves emitted repeatedly.

Figure 1:
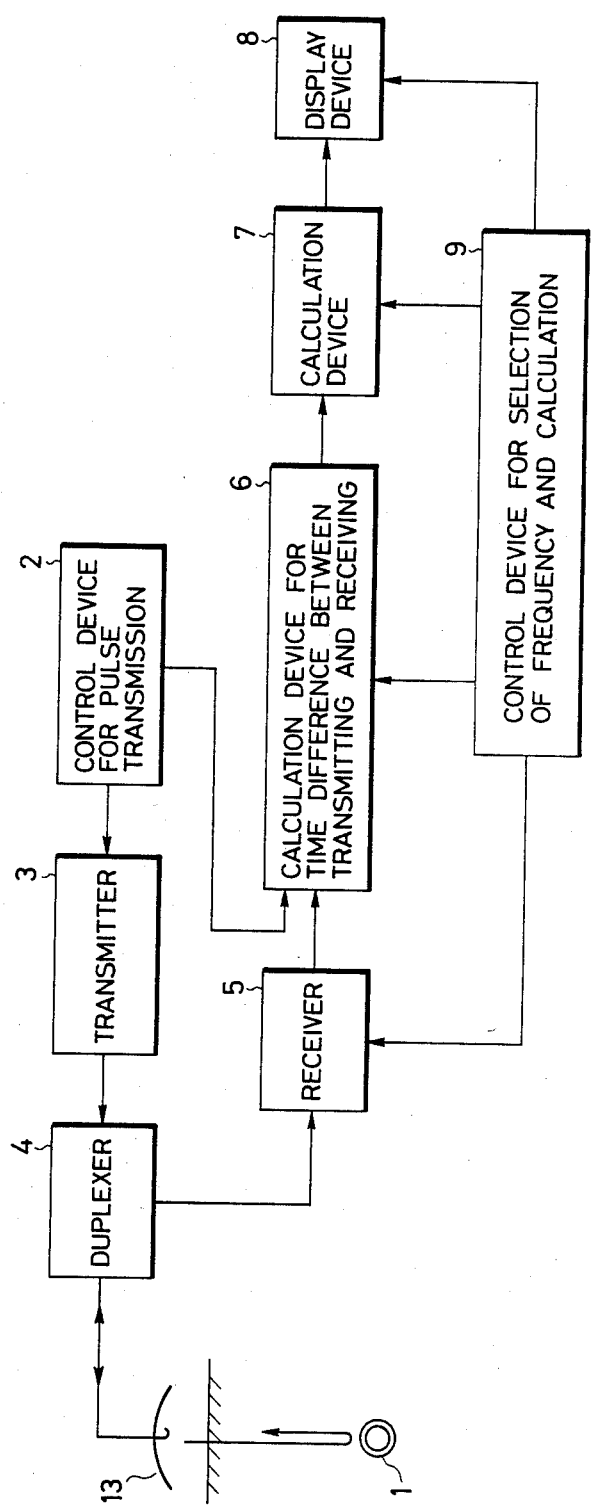
FIG. 1 shows a block diagram of the radar apparatus of the present invention.

Referring to FIG. 1, the radar apparatus of the present invention comprises a control device 2 for pulse transmission, a transmitter 3, a duplexer 4, an antenna or emitter 13 used in common for transmission and reception, a receiver 5, a calculation device 6 for time difference between transmitting and receiving signals, a calculation device 7, a desplay device 8, and a control device 9 for selection of frequency and calculation.

Figure 2:
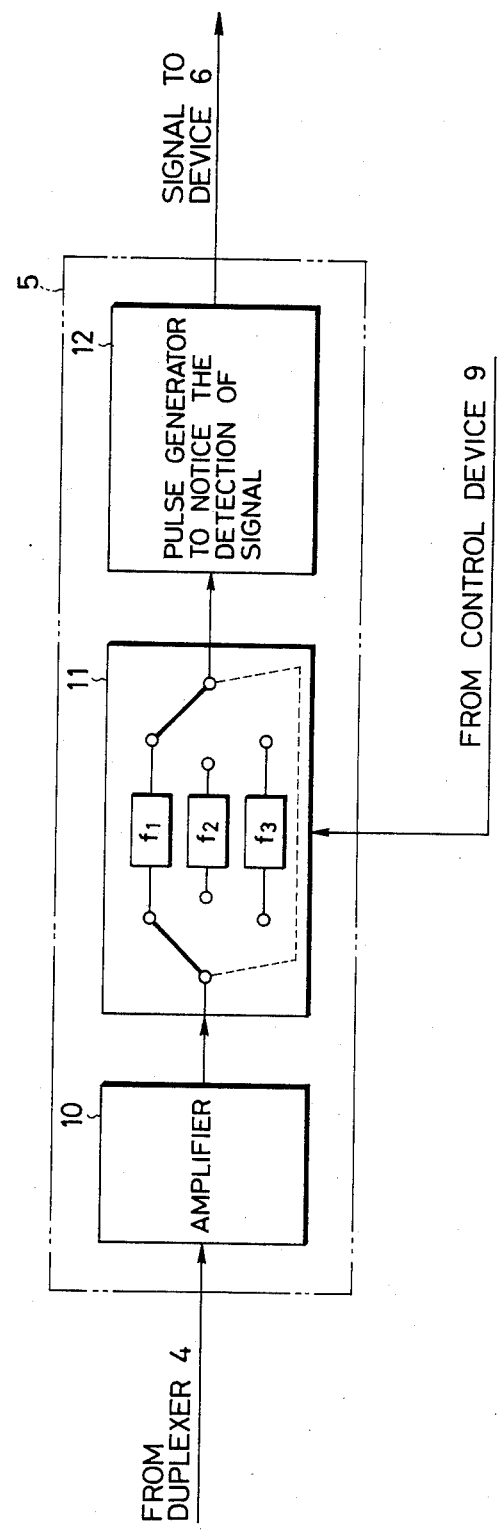
FIG. 2 shows a block diagram of the receiver shown in FIG. 1.

Referring to FIG. 2, the receiver 5 comprises an amplifier 10, a filter 11, and a pulse generator 12 to indicate the detection of a signal.

Figure 3:
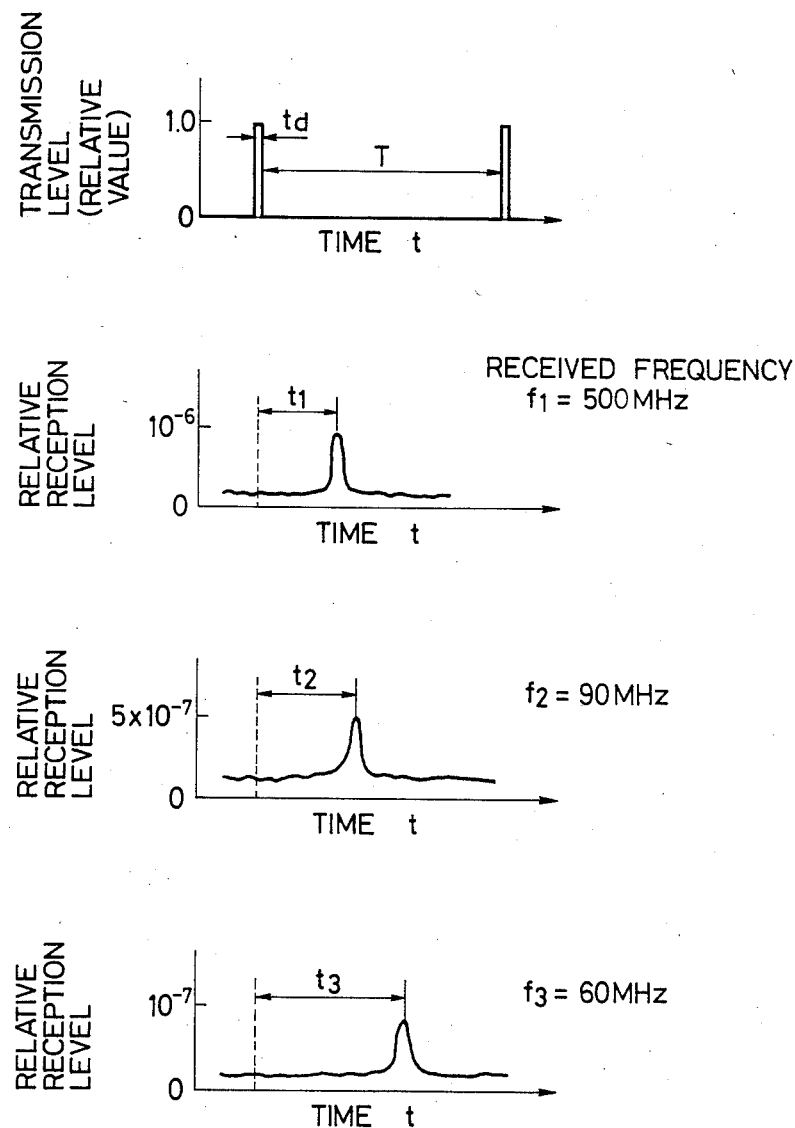
FIG. 3 shows variations with time of the transmission and reception levels of electromagnetic waves used in the present invention.

The control device 2 outputs a timing pulse for controlling the timing of a transmitting pulse used for detecting a buried object 1 in the ground. The transmitter 3 transmits the transmitting pulse from the control device 2 to the buried object 1 through a duplexer 4 and the antenna 8 The duplexer 4 transmits a echo signal reflected from the buried object 1 to the receiver 5. The receiving signal which is input to the receiver 5 is amplified by the amplifier 10, and is input to the filter 11. The filter 11 comprises three filters $f_1$, $f_2$, and $f_3$. These filters pass predetermined frequencies repeatedly by the control signal of the control device 9. The pulse generator 12 generates pulse signals when the receiving signals passed by these filters $f_1$, $f_2$, and $f_3$ reach predetermined thresholds, and outputs signals to the calculation device 6. The calculation device 6 calculates the time difference between the timing pulse from the control device 2 and the output signals from the pulse generator 12. The calculation device 7 calculates the distance from the antenna 8 to the buried object 1, permeability $\epsilon$, and conductivity $\sigma$ of the ground by the control signal from the control device 9 based on the above-mentioned Maxwell's equation (2) relating to speed of propagation of an electromagnetic wave using output signals of the calculation device 6. In the calculation device 7, the above-mentioned Maxwell's equation (2) can be calculated by non-linear Newton method. The display device 8 displays the obtained distance Variations with time of transmission pulses emitted from the antenna 13 of FIG. 1 are shown in FIG. 3. The fundamental period T of the pulse is set to be about 0.5 $\mu$sec or less. This is equivalent to the time until the reception of a reflected electromagnetic wave which is propagated 10 meters through a medium of a permitivity about one hundred times that in a vacuum and a conductivity of 0. Considering that the speed of propagation in soil is less than this, it is impossible for the reception time of the nth (n=1,2 ...) pulse emitted to be before the emission time of the (n+1)th pulse, so that the processing of a preceding pulse does not overlap with that of the subsequent pulse. Therefore the distance d to the object being detected can be computed without ambiguity. In addition, it has been confirmed that sufficiently large transmission signals can be obtained from Fourier frequency components of less than 1000 MHz if a pulse width $t_d$ is given by $t_d \leq 1$ nsec.

In the present embodiment, the received frequencies $f_1$, $f_2$, and $f_3$ are assumed to be 500 MHz, 90 MHz, and 60 MHz respectively. The highest frequency $f_1$ is assumed to be 500 MHz because the effect of the absorption of electromagnetic waves by the water in the earth is extremely large, and thus sufficiently strong reflected waves can not be obtained when that frequency approaches 1000 MHz. On the other hand, the lowest frequency $f_3$ is 60 MHz because the antenna must have a size which makes it easy to transport, thereof but must be about $\frac{1}{3}$ of the length of the electromagnetic waves (the length of these waves is five meters at a frequency of 60 MHz), to investigate the buried object.

A parabolic antenna of a diameter of 1.5 m is employed as the antenna 13 of FIG. 1. When the diameter of the opening plane of the parabolic antenna is D and the length of the electromagnetic waves $\lambda$, antenna gain G (the ratio compared with a half-wave dipole antenna) can be expressed by the following equation:

$$G = \left(\frac{\pi D}{\lambda}\right)^2 \qquad (8)$$

Accordingly, an approximate value of the gain is G=60 when the $f_1$=500 MHz, and G=1 when $f_3$=60 MHz.

A pulse signal is transmitted while the opening plane of the parabolic antenna 8 investigating the object buried in the ground is placed close to the surface of the ground. Simultaneously with the transmission of the pulse signal, reception is started, and the frequencies $f_1$, $f_2$ and $f_3$ are received. Since some proportion of the electromagnetic waves transmitted from the antenna are reflected by the surface of the ground, about 60% of the transmitted power enters the ground.

When a pipe is buried 3.5 meters deep in soil whose permittivity is about eight times that in a vacuum and whose conductivity is about $10^{-1}$ S/m, received signals of the frequencies $f_1$, $f_2$, and $f_3$ vary with time, as shown in FIG. 3. Each of the signals of the frequencies $f_1$, $f_2$, and $f_3$ can be received through a band-pass filter 11 which operates for each of the frequencies $f_1$, $f_2$, and $f_3$, and which is provided in the receiver 5 of the present invention, as shown in FIG. 2.

A delay $t_1$ in the reception of electromagnetic waves of $f_1$=500 MHz is about 65 nsec, the smallest delay, and delays $t_2$ and $t_3$ for reflected waves of the frequencies $f_2$=90 MHz and $f_3$=60 MHz are 120 nsec and 158 nsec, respectively. By using the results thus obtained, the following three simultaneous equations are solved by the calculation device 6 of FIG. 1:

$$\sqrt{2d} = \frac{1}{\sqrt{\epsilon\mu\left(\sqrt{1 + \left(\frac{\sigma}{\omega_i \epsilon}\right)^2} + 1\right)}} t_i \qquad (9)$$

(where: i=1, 2, 3)

$\mu = 1.26 \times 10^{-6}$ H/m (known)

As a result, the permittivity $\epsilon$, the conductivity $\sigma$ and the distance d to the object being detected are computed automatically and displayed on the CRT of the display device 8.

Figure 4:
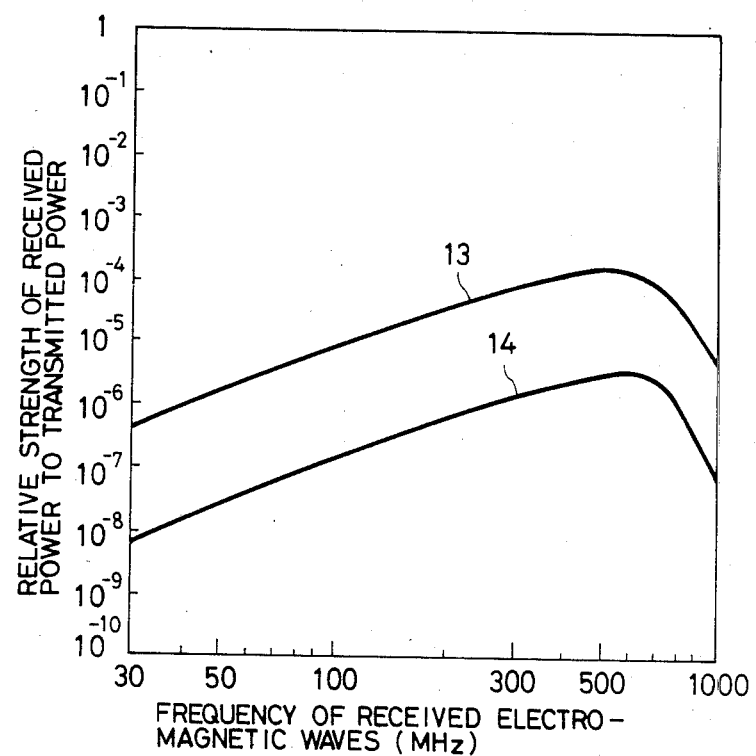
FIG. 4 shows the relationship between the frequency of received electromagnetic waves and reception intensity.

Curves 14 and 15 in FIG. 4 show the relative strength of received signal power with respect to transmitted signal power when the device of the present invention is applied to metal pipes of diameter 30 cm buried 2.5 and 3.5 meters deep in the ground, respectively. When the pipe is buried 3.5 meters deep, the relative strength of the received power to the transmitted power is $10^{-6}$ for a frequency of 500 MHz, and $10^{-7}$ for 60 MHz. Since high-sensitivity receivers can receive electromagnetic waves of a power of about $10^{31}$ $^{10}$ W, a received signal of sufficient strength can be obtained if electromagnetic waves of a power of at least 1 W are emitted as the transmission waves.

The distance d to the object being detected can be obtained in the way described above, and also the shape and extent, etc., of that object can be determined by moving the parabolic antenna horizontally while the direction of the emission of the electromagnetic waves by the antenna is kept vertical, and by comparing the reception intensities of reflected waves at different points.

The principle of the present invention is also applicable to the case in which reception intensities are compared using a plurality of linear antennas such as dipole antennas, and the values of $\epsilon$, $\mu$ and $\sigma$ and the distance d to the object being detected can also be calculated therefrom.

The present invention enables the provision of a radar apparatus which is, of course, provided with the functions of a conventional radar, but which is also able to determine the permittivity, permeability and conductivity of a medium and the distance to the object being detected in one measuring place which is not necessary to be right over the object by transmitting an electromagnetic waves and receiving it of two or more different frequencies in the same place, even when the constituents of the medium through which the electromagnetic waves are propagating toward the object and the composition ratios of these constituents are unknown, without errors, and, in particular, which is able to reduce satisfactorily the labor and cost required for probing for minerals when exploring energy resources, and investigating objects buried underground.

What we claim is:

1. In a radar apparatus for detecting a distance from an emitter of the radar apparatus to an underground object to be detected comprising a control device which outputs a timing pulse for controlling the timing of transmitting a detecting pulse used for detecting a buried object in the ground, a transmitter which transmits said detecting pulse from said control device to said buried object through an antenna, a receiver for receiving an echo signal reflected back from said buried object, and a display device for displaying said echo signal received from said receiver, the improvement comprising a calculation device for calculating time differences between said timing pulse from said control device and the time of receipt of signals of two or more different frequencies from said receiver to produce time difference signals, a calculation device for calculating said distance by solution of simultaneous equations based on the equation $$\sqrt{2d} = \frac{1}{\sqrt{\epsilon\mu \left( \sqrt{1 + \left(\frac{\sigma}{\omega_i \epsilon}\right)^2} + 1 \right)}} t_i$$

where
- d = distance from said radar apparatus to said underground object to be detected
- $\epsilon$ = electric permittivity of the medium of the ground
- $\mu$ = magnetic permeability of the medium of the ground
- $\sigma$ = electric conductivity of the medium of the ground
- $\omega_i$ = angular frequencies of electromagnetic waves received by said receiver (5)
- $t_i$ = delay time from transmission of pulse from said radar apparatus to reception thereof reflected from said underground object
- i = 1, 2 and 3 corresponding to said different frequencies relating to the speed of propagation of an electromagnetic wave for said different frequencies and said time differences, and a control device which controls said calculation device to start the calculation of said distance.

2. A radar apparatus according to claim 1, characterized in that said calculation device determines at least two of the permitivity, permeability, and conductivity of a propagation medium using said echo signals of two or more different frequencies, and computes said distance from the result of said determination by solution of simultaneous equations.

3. A radar apparatus according to claim 1, characterized in that said receiver comprises a band-pass filter comprising two or more different filters each of which pass a different predetermined frequency, means for selectively connecting said filters to receive said echo signal in response to control signals from said control device, and a pulse generator for generating pulse signals when the signals passed by said band-pass filter reach predetermined thresholds and for outputting said signals to said calculation device.

4. A radar apparatus according to claim 1, characterized in that said transmitter outputs a sinusoidal pulse to an antenna whose intensity varies as a sine wave according to the required receiving frequencies by receiving said timing pulse from said control device.

5. A radar apparatus according to claim 1, characterized in that said transmitter outputs a baseband pulse to an antenna in which Fourier components of pulse electromagnetic waves emitted over a wide frequency range are used by receiving said detecting pulse from said control device.

* * * * *